US010050311B2

United States Patent
Kwon et al.

(10) Patent No.: US 10,050,311 B2
(45) Date of Patent: Aug. 14, 2018

(54) ELECTRODE FOR SECONDARY BATTERY, SECONDARY BATTERY AND CABLE-TYPE SECONDARY BATTERY COMPRISING THE SAME

(71) Applicant: LG Chem, Ltd., Seoul (KR)

(72) Inventors: Yo-Han Kwon, Daejeon (KR);
Jang-Hyuk Hong, Daejeon (KR);
Hye-Ran Jung, Daejeon (KR);
Je-Young Kim, Dajeeon (KR);
Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/410,110

(22) Filed: Jan. 19, 2017

(65) Prior Publication Data

US 2017/0133719 A1    May 11, 2017

Related U.S. Application Data

(60) Division of application No. 14/279,917, filed on May 16, 2014, now Pat. No. 9,590,241, which is a
(Continued)

(30) Foreign Application Priority Data

Dec. 12, 2012  (KR) .................. 10-2012-0144394
Dec. 12, 2013  (KR) .................. 10-2013-0154427

(51) Int. Cl.
*H01M 10/0525* (2010.01)
*H01M 10/0563* (2010.01)
(Continued)

(52) U.S. Cl.
CPC ..... *H01M 10/0587* (2013.01); *H01M 2/0222* (2013.01); *H01M 4/0404* (2013.01);
(Continued)

(58) Field of Classification Search
CPC ......... H01M 10/0525; H01M 10/0563; H01M 10/0569; H01M 10/0587; H01M 2220/30;
(Continued)

(56) References Cited

U.S. PATENT DOCUMENTS 1,447,657 A    3/1923 Gouin et al.
6,488,721 B1   12/2002 Carlson
(Continued)

FOREIGN PATENT DOCUMENTS

CN    1423353 A    6/2003
JP    09-007629    1/1997
(Continued)

OTHER PUBLICATIONS

Wang, Z. et al. "Structural and electrochemical characterizations of surface-modified LiCoO2 cathode materials for Li-ion batteries", Solid State Ionics, vol. 148, pp. 335-342, published Apr. 21, 2002.*
(Continued)

*Primary Examiner* — Sarah A. Slifka
*Assistant Examiner* — Lilia V Nedialkova
(74) *Attorney, Agent, or Firm* — Lerner, David, Littenberg, Krumholz & Mentlik, LLP

(57) ABSTRACT

The present invention provides an electrode for a secondary battery, more specifically an electrode for a secondary battery, comprising a current collector; an electrode active material layer formed on at least one surface or the whole outer surface of the current collector; a conductive material-coating layer formed on the top surface of the electrode active material layer and comprising a conductive material and a first polymer binder; and a porous coating layer formed on the top surface of the conductive material-coating layer and comprising a second polymer binder. Also, the present invention provides a secondary battery and a cable-type secondary battery comprising the electrode.

20 Claims, 5 Drawing Sheets

Related U.S. Application Data continuation of application No. PCT/KR2013/011511, filed on Dec. 12, 2013.

(51) Int. Cl.

| | | |
|---|---|---|
| *H01M 10/0569* | (2010.01) | |
| *H01M 10/0587* | (2010.01) | |
| *H01M 2/02* | (2006.01) | |
| *H01M 4/04* | (2006.01) | |
| *H01M 4/131* | (2010.01) | |
| *H01M 4/134* | (2010.01) | |
| *H01M 4/1391* | (2010.01) | |
| *H01M 4/38* | (2006.01) | |
| *H01M 4/48* | (2010.01) | |
| *H01M 4/62* | (2006.01) | |
| *H01M 4/66* | (2006.01) | |
| *H01M 4/74* | (2006.01) | |
| *H01M 4/75* | (2006.01) | |

(52) U.S. Cl.
CPC ....... *H01M 4/0452* (2013.01); *H01M 4/0471* (2013.01); *H01M 4/131* (2013.01); *H01M 4/134* (2013.01); *H01M 4/1391* (2013.01); *H01M 4/387* (2013.01); *H01M 4/483* (2013.01); *H01M 4/623* (2013.01); *H01M 4/625* (2013.01); *H01M 4/661* (2013.01); *H01M 4/74* (2013.01); *H01M 4/75* (2013.01); *H01M 10/0525* (2013.01); *H01M 10/0563* (2013.01); *H01M 10/0569* (2013.01); *H01M 2220/30* (2013.01); *H01M 2300/002* (2013.01); *H01M 2300/0037* (2013.01)

(58) Field of Classification Search
CPC ... H01M 2300/002; H01M 2300/0037; H01M 2/0222; H01M 4/0404; H01M 4/0452; H01M 4/0471; H01M 4/131; H01M 4/134; H01M 4/1391; H01M 4/387; H01M 4/483; H01M 4/623; H01M 4/625; H01M 4/661; H01M 4/74; H01M 4/75

See application file for complete search history.

(56) References Cited

U.S. PATENT DOCUMENTS

| | | | |
|---|---|---|---|
| 7,037,581 B2 | 5/2006 | Aramata et al. | |
| 8,119,273 B1 | 2/2012 | Gerald, II et al. | |
| 2003/0049529 A1 | 3/2003 | Cho et al. | |
| 2005/0266150 A1 | 12/2005 | Yong et al. | |
| 2006/0040181 A1 | 2/2006 | Kim et al. | |
| 2008/0118836 A1 | 5/2008 | Hwang et al. | |
| 2010/0203372 A1 | 8/2010 | Kim et al. | |
| 2010/0291430 A1 | 11/2010 | Lee et al. | |
| 2011/0123866 A1 | 5/2011 | Pan et al. | |
| 2011/0177369 A1 | 7/2011 | Endo et al. | |
| 2012/0058376 A1* | 3/2012 | Kwon | H01M 2/0237 429/94 |
| 2012/0295144 A1 | 11/2012 | Kwon et al. | |
| 2013/0004817 A1 | 1/2013 | Lee et al. | |
| 2013/0260200 A1 | 10/2013 | Yun et al. | |
| 2013/0288136 A1 | 10/2013 | Arora et al. | |
| 2013/0295425 A1 | 11/2013 | Kwon et al. | |
| 2014/0110634 A1 | 4/2014 | Cho et al. | |

FOREIGN PATENT DOCUMENTS

| | | |
|---|---|---|
| JP | 2001110445 A | 4/2001 |
| JP | 2010-160984 A | 7/2010 |
| KR | 2000-0045100 A | 7/2000 |
| KR | 2006-0041649 A | 5/2006 |
| KR | 20080010166 A | 1/2008 |
| KR | 2009-0051546 A | 5/2009 |
| KR | 20120000708 A | 1/2012 |
| KR | 20120000744 A | 1/2012 |
| WO | 2005098994 A1 | 10/2005 |
| WO | 2005112151 A1 | 11/2005 |
| WO | 2012128440 A1 | 9/2012 |

OTHER PUBLICATIONS

Kwon, Y.H., et al. "Cable-Type Flexible Lithium Ion Battery Based on Hollow Multi-Helix Electrodes", Advanced Materials, vol. 24, pp. 5192-5197, published Aug. 7, 2012.
Written Opinion for Application No. PCT/KR2013/011511 dated Apr. 9, 2014.
Written Opinion of the International Searching Authority for PCT/KR2013/011514 dated Apr. 22, 2014.

\* cited by examiner

ELECTRODE FOR SECONDARY BATTERY, SECONDARY BATTERY AND CABLE-TYPE SECONDARY BATTERY COMPRISING THE SAME

CROSS-REFERENCE TO RELATED APPLICATION

This application is a divisional of U.S. patent application Ser. No. 14/279,917 filed on May 16, 2014 which is a continuation of International Application No. PCT/KR2013/011511 filed on Dec. 12, 2013, which claims priority under 35 USC 119(a) to Korean Patent Application No. 10-2012-0144394 filed in the Republic of Korea on Dec. 12, 2012, and Korean Patent Application No. 10-2013-0154427 filed in the Republic of Korea on Dec. 12, 2013, the disclosures of which are incorporated herein by reference.

TECHNICAL FIELD

The present invention relates to an electrode for a secondary battery, more specifically to an electrode for a secondary battery which can prevent the release of an electrode active material layer and increase the conductivity of an electrode to enhance the cycle life characteristics of the battery, a secondary battery and a cable-type secondary battery comprising the electrode.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. The cable-type batteries are easy in shape variation, while being subject to stress due to external force for the shape variation. Also, the electrode active material layer of cable-type batteries may be released by rapid volume expansion during charging and discharging processes. From these reasons, the capacity of the batteries may be reduced and the cycle life characteristics thereof may be deteriorated.

In order to overcome such a problem, the electrode active material layer may further have a coating layer of a polymer binder on the top surface thereof. The coating layer of a polymer binder can improve the cycle life characteristics of batteries, but may increase electrode resistance due to the substantial absence of pores present in the coating layer to inhibit the introduction of an electrolyte solution in an electrode active material layer.

DISCLOSURE

Technical Problem

The present invention is designed to solve the above-mentioned problems, and therefore it is directed to providing an electrode for a secondary battery, which can prevent the release of an electrode active material layer and increase the conductivity of an electrode to enhance the cycle life characteristics of the battery, and also can allow the good introduction of an electrolyte solution in an electrode active material layer to prevent the increase of electrode resistance; and a secondary battery and a cable-type secondary battery comprising the electrode.

Technical Solution

In accordance with one aspect of the present invention, there is provided an electrode for a secondary battery, comprising a current collector; an electrode active material layer formed on at least one surface or the whole outer surface of the current collector; a conductive material-coating layer formed on the top surface of the electrode active material layer and comprising a conductive material and a first polymer binder; and a porous coating layer formed on the top surface of the conductive material-coating layer and comprising a second polymer binder.

The current collector used in the electrode of the present invention may be a planar form, a hollow form, a wire form, a wound wire form, a wound sheet form or a mesh form.

The conductive material and the first polymer binder in the conductive material-coating layer may be present in a weight ratio of 1:10 to 8:10.

The conductive material-coating layer may have pores having a size of 0.01 to 5 μm, and may have a porosity of 5 to 70%.

The conductive material may comprise any one selected from the group consisting of carbon black, acetylene black, ketjen black, carbon fiber, carbon nanotube, graphene and a mixture thereof.

Also, the first polymer binder may be selected from the group consisting of polyvinylidene fluoride (PVDF), hexafluoro propylene (HFP), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Meanwhile, the porous coating layer may have pores having a size of 0.01 to 10 µm, and may have a porosity of 5 to 95%.

The porous coating layer may further comprise inorganic particles.

In this case, the inorganic particles and the second polymer binder in the porous coating layer may be present in a weight ratio of 10:90 to 95:5.

The inorganic particles may be inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $SiO_2$, AlOOH, $Al(OH)_3$, $TiO_2$ and a mixture thereof.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 10 nm to 5 µm.

Also, the second polymer binder may be selected from the group consisting of polyvinylidene fluoride (PVDF), hexafluoro propylene (HFP), polyvinylidene fluoride-co-hexafluoro propylene, polyvinylidene fluoride-co-trichloro-ethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Meanwhile, the electrode for a secondary battery may be an anode.

In this case, the electrode active material layer may comprise an active material selected from the group consisting of metals (Me) including Si, Sn, Li, Al, Ag, Bi, In, Ge, Pb, Pt, Ti, Zn, Mg, Cd, Ce, Cu, Co, Ni and Fe; alloys of the metals; oxides (MeOx) of the metals; and a mixture thereof.

In accordance with another aspect of the present invention, there is provided a secondary battery comprising a cathode, an anode, a separator interposed between the cathode and the anode, and a non-aqueous electrolyte solution, wherein the anode is the electrode for a secondary battery according to the present invention.

In accordance with still another aspect of the present invention, there is provided a cable-type secondary battery having a horizontal cross section and extending longitudinally, and comprising: a core for supplying lithium ions, which comprises an electrolyte; an inner electrode comprising an open-structured inner current collector surrounding the outer surface of the core for supplying lithium ions, an inner electrode active material layer surrounding the outer surface of the inner current collector, a conductive material-coating layer formed on the outer surface of the inner electrode active material layer and comprising a conductive material and a first polymer binder, and a porous coating layer formed on the outer surface of the conductive material-coating layer and comprising a second polymer binder; a separation layer surrounding the outer surface of the inner electrode to prevent a short circuit between electrodes; and an outer electrode surrounding the outer surface of the separation layer and comprising an outer current collector and an outer electrode active material layer.

In the cable-type secondary battery, the open-structured inner current collector may be a wound wire form, a wound sheet form or a mesh form.

In the cable-type secondary battery, the inner electrode may be an anode, and the inner electrode active material layer may comprise an active material selected from the group consisting of metals (Me) including Si, Sn, Li, Al, Ag, Bi, In, Ge, Pb, Pt, Ti, Zn, Mg, Cd, Ce, Cu, Co, Ni and Fe; alloys of the metals; oxides (MeOx) of the metals; and a mixture thereof.

In the outer electrode, the outer electrode active material layer may be formed to surround the outer surface of the separation layer, and the outer current collector may be formed to surround the outer surface of the outer electrode active material layer; the outer current collector may be formed to surround the outer surface of the separation layer, and the outer electrode active material layer may be formed to surround the outer surface of the outer current collector; the outer current collector may be formed to surround the outer surface of the separation layer, and the outer electrode active material layer may be formed to surround the outer surface of the outer current collector and come into contact with the separation layer; or the outer electrode active material layer may be formed to surround the outer surface of the separation layer, and the outer current collector may be formed to be included inside the outer electrode active material layer by being covered therein and to surround the outer surface of the separation layer with spacing apart therefrom.

Alternatively, in accordance with still another aspect of the present invention, there is provided a cable-type secondary battery having a horizontal cross section and extending longitudinally, and comprising: a core for supplying lithium ions, which comprises an electrolyte; an inner electrode comprising an open-structured inner current collector surrounding the outer surface of the core for supplying lithium ions, and an inner electrode active material layer surrounding the outer surface of the inner current collector; a separation layer surrounding the outer surface of the inner electrode to prevent a short circuit between electrodes; and an outer electrode surrounding the outer surface of the separation layer and comprising an outer current collector, an outer electrode active material layer, a conductive material-coating layer comprising a conductive material and a first polymer binder, and a porous coating layer comprising a second polymer binder.

In the cable-type secondary battery, the outer electrode may be an anode, and the outer electrode active material layer may comprise an active material selected from the group consisting of metals (Me) including Si, Sn, Li, Al, Ag, Bi, In, Ge, Pb, Pt, Ti, Zn, Mg, Cd, Ce, Cu, Co, Ni and Fe; alloys of the metals; oxides (MeOx) of the metals; and a mixture thereof.

In the outer electrode, the porous coating layer comprising a second polymer binder may be formed to surround the outer surface of the separation layer, the conductive material-coating layer comprising a conductive material and a first polymer binder may be formed to surround the porous coating layer, the outer electrode active material layer may be formed to surround the conductive material-coating layer, and the outer current collector may be formed to surround the outer surface of the outer electrode active material layer; the outer current collector may be formed to surround the outer surface of the separation layer, the outer electrode active material layer may be formed to surround the outer surface of the outer current collector, the conductive material-coating layer comprising a conductive material and a first polymer binder may be formed to surround the outer electrode active material layer, and the porous coating layer comprising a second polymer binder may be formed to surround the conductive material-coating layer; the outer current collector may be formed to surround the outer surface of the separation layer, the outer electrode active material layer may be formed to surround the outer surface of the outer current collector and come into contact with the separation layer, the conductive material-coating layer comprising a conductive material and a first polymer binder may be formed to surround the outer electrode active material layer, and the porous coating layer comprising a second polymer binder may be formed to surround the conductive material-coating layer; or the outer electrode active material layer may be formed to surround the outer surface of the separation layer, the outer current collector may be formed to be included inside the outer electrode active material layer by being covered therein and to surround the outer surface of the separation layer with spacing apart therefrom, the conductive material-coating layer comprising a conductive material and a first polymer binder may be formed to surround the outer electrode active material layer, and the porous coating layer comprising a second polymer binder may be formed to surround the conductive material-coating layer.

Meanwhile, the separation layer may be an electrolyte layer or a separator.

The electrolyte layer may comprise an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

The lithium salt may be selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer.

Also, in accordance with yet still another aspect of the present invention, there is provided a cable-type secondary battery having a horizontal cross section and extending longitudinally, and comprising: two or more cores for supplying lithium ions, which comprise an electrolyte; two or more inner electrodes arranged in parallel to each other, each inner electrode comprising an open-structured inner current collector surrounding the outer surface of each core for supplying lithium ions, an inner electrode active material layer surrounding the outer surface of the inner current collector, a conductive material-coating layer formed on the outer surface of the inner electrode active material layer and comprising a conductive material and a first polymer binder, and a porous coating layer formed on the outer surface of the conductive material-coating layer and comprising a second polymer binder; a separation layer surrounding the outer surface of the inner electrodes to prevent a short circuit between electrodes; and an outer electrode surrounding the outer surface of the separation layer and comprising an outer current collector and an outer electrode active material layer.

In addition, in accordance with yet still another aspect of the present invention, there is provided a cable-type secondary battery having a horizontal cross section and extending longitudinally, and comprising: two or more cores for supplying lithium ions, which comprise an electrolyte; two or more inner electrodes arranged in parallel to each other, each inner electrode comprising an open-structured inner current collector surrounding the outer surface of each core for supplying lithium ions, an inner electrode active material layer surrounding the surface of the inner current collector, a conductive material-coating layer formed on the outer surface of the inner electrode active material layer and comprising a conductive material and a first polymer binder, a porous coating layer formed on the outer surface of the conductive material-coating layer and comprising a second polymer binder, and a separation layer surrounding the outer surface of the porous coating layer to prevent a short circuit between electrodes; and an outer electrode surrounding the outer surface of the inner electrodes and comprising an outer current collector and an outer electrode active material layer.

Further, in accordance with yet still another aspect of the present invention, there is provided a cable-type secondary battery having a horizontal cross section and extending longitudinally, and comprising: two or more cores for supplying lithium ions, which comprise an electrolyte; two or more inner electrodes arranged in parallel to each other, each inner electrode comprising an open-structured inner current collector surrounding the outer surface of each core for supplying lithium ions, and an inner electrode active material layer surrounding the surface of the inner current collector; a separation layer surrounding the outer surface of the inner electrodes to prevent a short circuit between electrodes; and an outer electrode surrounding the outer surface of the separation layer and comprising an outer current collector, an outer electrode active material layer, a conductive material-coating layer comprising a conductive material and a first polymer binder, and a porous coating layer comprising a second polymer binder.

Furthermore, in accordance with yet still another aspect of the present invention, there is provided a cable-type secondary battery having a horizontal cross section and extending longitudinally, and comprising: two or more cores for supplying lithium ions, which comprise an electrolyte; two or more inner electrodes arranged in parallel to each other, each inner electrode comprising an open-structured inner current collector surrounding the outer surface of each core for supplying lithium ions, an inner electrode active material layer surrounding the surface of the inner current collector, and a separation layer surrounding the outer surface of the inner electrode active material layer to prevent a short circuit between electrodes; and an outer electrode surrounding the outer surface of the inner electrodes and comprising an outer current collector, an outer electrode active material layer, a conductive material-coating layer comprising a conductive material and a first polymer binder, and a porous coating layer comprising a second polymer binder.

Advantageous Effects

In accordance with the present invention, an electrode active material layer can be prevented from being released owing to stress generated by external force for the shape variation of cable-type secondary batteries and the like or owing to its rapid volume expansion during charging and discharging processes, thereby minimizing a capacity decrease in the batteries and increasing the conductivity of electrodes to provide enhanced cycle life characteristics in the batteries.

Also, the present invention can allow the good introduction of an electrolyte solution in an electrode active material layer to prevent the increase of electrode resistance, and can prevent the generation of cracks in a conductive material-coating layer formed on the top surface of an electrode active material layer or can prevent the release of the conductive material-coating layer when external forces are applied for bending or twisting.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

Figure 1:
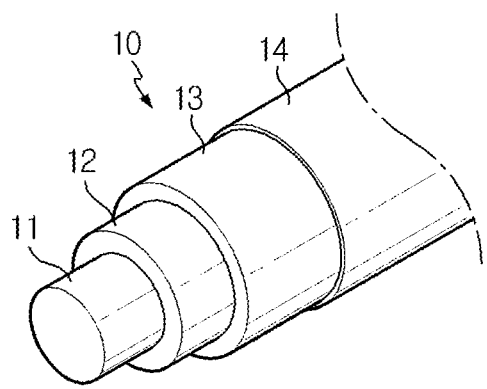
FIG. 1 is a perspective view showing an electrode for a cable-type secondary battery, comprising a wire current collector, in accordance with one embodiment of the present invention.

EXPLANATION OF REFERENCE NUMERALS 10, 20: Electrode for cable-type secondary battery
11: Wire current collector
12, 22: Electrode active material layer
13, 23: Conductive material-coating layer
14, 24: Porous coating layer
21: Hollow current collector
100, 200, 300, 400: Cable-type secondary battery
110, 210, 310, 410: Core for supplying lithium ions
120, 220, 320, 420: Inner current collector
130, 230, 330, 430: Inner electrode active material layer
140, 240, 340, 440: Separation layer
150, 250, 350, 450: Outer electrode active material layer
160, 260, 360, 460: Outer current collector
170, 270, 370, 470: Protection coating
131, 251, 331, 451: Conductive material-coating layer
132, 252, 332, 452: Porous coating layer

BEST MODE

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Also, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

The electrode for a secondary battery according to the present invention comprises a current collector; an electrode active material layer formed on at least one surface or the whole outer surface of the current collector; a conductive material-coating layer formed on the top surface of the electrode active material layer and comprising a conductive material and a first polymer binder; and a porous coating layer formed on the top surface of the conductive material-coating layer and comprising a second polymer binder.

The current collector used in the electrode of the present invention may be a planar form, a hollow form, a wire form, a wound wire form, a wound sheet form or a mesh form, but is not limited thereto. Various kinds of current collectors may be used depending on the forms of secondary batteries.

In the case that a planar current collector is used, the electrode active material layer may be formed on at least one surface of the top and bottom surfaces of the current collector. In the case that a hollow current collector is used, the electrode active material layer may be formed on at least one surface of the inner or outer surfaces of the current collector. In the case that a wire current collector is used, the electrode active material layer may be formed on the whole surface of the current collector. In the case that a current collector of a wound wire, wound sheet or mesh form is used, the electrode active material layer may be formed on at least one surface of the inner or outer surfaces of the current collector or may be formed to surround the whole surface of the current collector.

Figure 2:
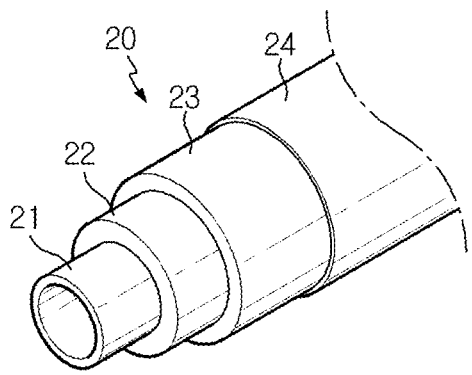
FIG. 2 is a perspective view showing an electrode for a cable-type secondary battery, comprising a hollow current collector, in accordance with one embodiment of the present invention.

FIG. 1 is a perspective view showing an electrode for a cable-type secondary battery, comprising a wire current collector, in accordance with one embodiment of the present invention. FIG. 2 is a perspective view showing an electrode for a cable-type secondary battery, comprising a hollow current collector, in accordance with one embodiment of the present invention.

Referring to FIG. 1, an electrode 10 for a cable-type secondary battery extends longitudinally, and comprises a wire current collector 11; an electrode active material layer 12 formed to surround the whole outer surface of the wire current collector 11; a conductive material-coating layer 13 formed to surround the top surface of the electrode active material layer 12 and comprising a conductive material and a first polymer binder; and a porous coating layer 14 formed to surround the top surface of the conductive material-coating layer 13 and comprising a second polymer binder. The electrode 10 for a cable-type secondary battery may be used as the inner electrode of the cable-type secondary battery by winding one or more wire in a coil form, or by twisting two or more wires spirally to obtain one or more wire complex and winding the wire complex in a coil form.

Referring to FIG. 2, an electrode 20 for a cable-type secondary battery extends longitudinally, and comprises a hollow current collector 21; an electrode active material layer 22 formed on the outer surface of the hollow current collector 21; a conductive material-coating layer 23 formed to surround the top surface of the electrode active material layer 22 and comprising a conductive material and a first polymer binder; and a porous coating layer 24 formed on the top surface of the conductive material-coating layer 23 and comprising a second polymer binder. The electrode 20 for a cable-type secondary battery may be used as the outer electrode of the cable-type secondary battery.

In the electrode for a cable-type secondary battery, the electrode active material layer formed on the current collector may be released or completely peeled off from the current collector owing to stress generated by external force for the shape variation of the battery or owing to its rapid volume expansion during charging and discharging processes. As a result, the electrical conductivity of the electrode is reduced, making it difficult to provide sufficient capacity in the battery, thereby obtaining a low initial efficiency. Particularly, in the case of a metal-based anode active material layer formed by electroplating or anodic oxidation, such a release may be severe due to the absence of a polymer binder and a conductive material.

In order to prevent such a problem, in the electrode of the present invention, a conductive material-coating layer which comprises a conductive material and a first polymer binder is formed on the outer surface of the electrode active material layer, a porous coating layer which comprises a second polymer binder is formed on the outer surface of the conductive material-coating layer. Thereby, the electrode of the present invention can be inhibited from the release of the electrode active material layer, thereby preventing a capacity decrease in batteries, and its conductivity becomes increased to provide enhanced cycle life characteristics in the batteries.

In the present invention, the conductive material-coating layer can serves as a buffer region which can minimize the release of the electrode active material layer, and can contribute to increase an initial efficiency and improve cycle life characteristics due to the presence of a conductive material having good conductivity.

Also, since the release of the electrode active material layer is inhibited even if external forces are applied during battery bending, the flexibility of cable-type batteries can be improved. Further, in the electrode of the present invention, an electrolyte solution can be better introduced in the electrode active material layer through pores present in the porous coating layer, thereby preventing the increase of electrode resistance and eventually enhancing battery performances.

In the conductive material-coating layer, the conductive material and the first polymer binder may be present in a weight ratio of 1:10 to 8:10. When the weight ratio satisfies such numerical range, it can achieve the effects of inhibiting the release of the electrode active material layer and providing conductivity in the electrode active material layer to increase an initial efficiency and improve life characteristics.

Meanwhile, in the conductive material-coating layer, pores may be formed to allow the introduction of an electrolyte solution. The pores present in the conductive material-coating layer should have a size smaller than that of particles composing the electrode active material layer so as to inhibit the release of the electrode active material layer. Also, it is preferred that the pores have a size greater than the radius of solvated lithium ions in the electrolyte solution so as for the electrolyte solution to be well introduced in the electrode. To meet such conditions, the pores present in the conductive material-coating layer may have a size of 0.01 to 5 μm, and the conductive material-coating layer may have a porosity of 5 to 70%. The conductive material which may be used in the present invention is not particularly limited if it has conductivity and does not cause a chemical change in secondary batteries. For example, carbon black, acetylene black, ketjen black, carbon fiber, carbon nanotube and graphene which are generally known as a conductive material may be used, and also metal powders, conductive metal oxide and organic conductive agent may be used. Examples of a commercially available conductive material include acetylene black-based products (Chevron Chemical Company or Gulf Oil Company), EC-based products (Armak Company), Vulcan, XC-72 (Cabot Company) and Super P (MMM Carbon Company).

Also, the first polymer binder may be selected from the group consisting of polyvinylidene fluoride (PVDF), hexafluoro propylene (HFP), polyvinylidene fluoride-co-hexafluoro propylene, polyvinylidene fluoride-co-trichloro-ethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof, but is not limited thereto.

Meanwhile, the porous coating layer may be formed to have a porous structure by phase separation or phase change during its preparation.

The pores formed in the porous coating layer should have a size smaller than that of particles composing the electrode active material layer so as to inhibit the release of the electrode active material layer. Also, it is preferred that the pores have a size greater than the radius of solvated lithium ions in the electrolyte solution so as for the electrolyte solution to be well introduced in the electrode. To meet such conditions, the pores present in the porous coating layer may have a size of 0.01 to 10 μm.

Also, in order to achieve the above-mentioned effects, the porous coating layer may have a porosity of 5 to 95%.

Meanwhile, the porous coating layer may further comprise inorganic particles.

In such a porous coating layer, the inorganic particles are bound to each other by the second polymer binder in the state that the inorganic particles are filled in contact with each other, from which interstitial volumes are formed between the inorganic particles. The interstitial volumes between the inorganic particles become empty spaces to form pores.

In the porous coating layer, the inorganic particles and the second polymer binder may be present in a weight ratio of 10:90 to 95:5.

The inorganic particles which may be used in the present invention are not particularly limited if they are electrochemically stable. That is, the inorganic particles which may be used in the present invention are not particularly limited unless an oxidation-reduction reaction occurs in an operating voltage range (for example, 0 to 5 V based on Li/Li$^+$) of an applied electrochemical device. Particularly, inorganic particles having ion-transferring ability can increase an ionic conductivity in an electrochemical device to achieve the performance improvement of the device.

For the foregoing reasons, the inorganic particles used in the present invention preferably include inorganic particles having a dielectric constant of 5 or higher, preferably 10 or higher. Examples of the inorganic particles having a dielectric constant of 5 or higher include BaTiO$_3$, Pb(Zr$_x$, Ti$_{1-x}$)O$_3$(PZT, 0<x<1), Pb$_{1-x}$La$_x$Zr$_{1-y}$Ti$_y$O$_3$ (PLZT, 0<x<1, 0<y<1), (1–x)Pb(Mg$_{1/3}$Nb$_{2/3}$)O$_3$-xPbTiO$_3$ (PMN-PT, 0<x<1), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, SiC, SiO$_2$, AlOOH, Al(OH)$_3$, TiO$_2$ and a mixture thereof.

Also, the inorganic particles having the ability to transport lithium ions, i.e., lithium-containing inorganic particles which can transfer lithium ions without holding them, may be used. Examples of the inorganic particles having the ability to transport lithium ions include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ type glass (0<x<4, 0<y<13), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$ type glass (Li$_x$Si$_y$S$_z$, 0<x<3, 0<y<2, 0<z<4), P$_2$S$_5$ type glass (Li$_x$P$_y$S$_z$, 0<x<3, 0<y<3, 0<z<7) inorganic particles, and a mixture thereof.

The inorganic particles are not limited to their size, but are preferable to have an average diameter of 10 nm to 5 μm, so as to obtain a suitable porosity of the porous coating layer.

The second polymer binder may be selected from the group consisting of polyvinylidene fluoride (PVDF), hexafluoro propylene (HFP), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof, but is not limited thereto.

Meanwhile, the inner current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer. The outer current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Such a current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

Meanwhile, the electrode for a secondary battery may be used as an anode. In this case, the electrode active material layer may comprise an active material selected from the group consisting of metals (Me) including Si, Sn, Li, Al, Ag, Bi, In, Ge, Pb, Pt, Ti, Zn, Mg, Cd, Ce, Cu, Co, Ni and Fe; alloys of the metals; oxides (MeOx) of the metals; and a mixture thereof.

In the present invention, the electrode active material layer allows ions to move through the current collector, and the movement of ions is caused by the interaction of ions such as intercalation/deintercalation of ions into and from the electrolyte layer.

Also, the present invention provides a secondary battery comprising a cathode, an anode, a separator interposed between the cathode and the anode, and a non-aqueous electrolyte solution, wherein the anode is the above-mentioned electrode for a secondary battery according to the present invention.

The secondary battery of the present invention may be in the general form of stacking, winding or stacking/folding, and also it may be in the particular form of cable type.

Specifically, a cable-type secondary battery according to one aspect of the present invention, which has a horizontal cross section and extends longitudinally, comprises a core for supplying lithium ions, which comprises an electrolyte; an inner electrode comprising an open-structured inner current collector surrounding the outer surface of the core for supplying lithium ions, an inner electrode active material layer surrounding the outer surface of the inner current collector, a conductive material-coating layer formed on the outer surface of the inner electrode active material layer and comprising a conductive material and a first polymer binder, and a porous coating layer formed on the outer surface of the conductive material-coating layer and comprising a second polymer binder; a separation layer surrounding the outer surface of the inner electrode to prevent a short circuit between electrodes; and an outer electrode surrounding the outer surface of the separation layer and comprising an outer current collector and an outer electrode active material layer.

As used herein, the term 'open-structured' means that a structure has an open boundary surface through which a substance may be transferred freely from the inside of the structure to the outside thereof. The open-structured inner current collector may be in the form of a wound wire, a wound sheet or a mesh, but is not limited thereto.

Also, the term 'a horizontal cross section' may refer to a circular or polygonal shape. The circular shape includes circles having a perfectly symmetrical geometric structure and ovals having an asymmetrical structure. The polygonal shape is not limited to any particular form, but examples thereof may include triangular, tetragonal, pentagonal and hexagonal forms.

As mentioned above, the porous coating layer may further comprise inorganic particles.

In the cable-type secondary battery, the inner electrode may be an anode, and the inner electrode active material layer may comprise an active material selected from the group consisting of metals (Me) including Si, Sn, Li, Al, Ag, Bi, In, Ge, Pb, Pt, Ti, Zn, Mg, Cd, Ce, Cu, Co, Ni and Fe; alloys of the metals; oxides (MeOx) of the metals; and a mixture thereof.

Also, the outer electrode may be a cathode, and the outer active material layer may comprise a cathode active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

The cable-type secondary battery of the present invention has a horizontal cross section with a linear structure which extends in the longitudinal direction, and thus has flexibility, so it can freely change in shape.

Figure 3:
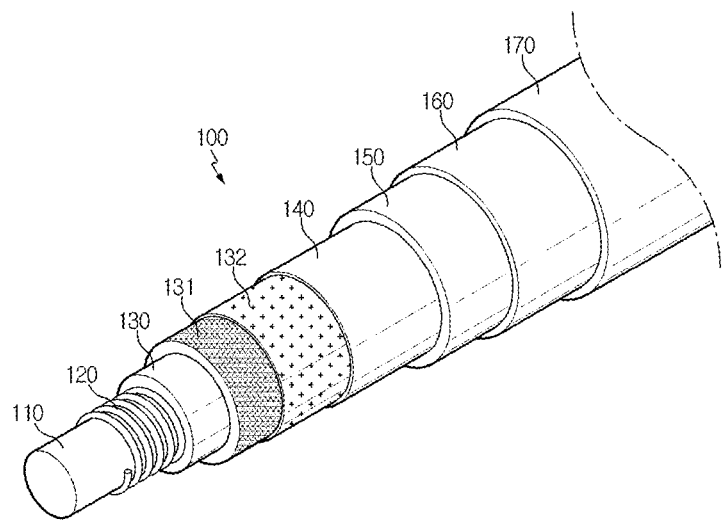
FIG. 3 is a perspective view showing a cable-type secondary battery having one inner electrode in accordance with one embodiment of the present invention.

FIG. 3 is a perspective view showing a cable-type secondary battery having one inner electrode in accordance with one embodiment of the present invention.

Referring to FIG. 3, a cable-type secondary battery 100 comprises a core 110 for supplying lithium ions, which comprises an electrolyte; an inner electrode comprising an open-structured inner current collector 120 surrounding the outer surface of the core 110 for supplying lithium ions, an inner electrode active material layer 130 surrounding the outer surface of the inner current collector 120, a conductive material-coating layer 131 formed on the outer surface of the inner electrode active material layer 130 and comprising a conductive material and a first polymer binder, and a porous coating layer 132 formed on the outer surface of the conductive material-coating layer 131 and comprising a second polymer binder; a separation layer 140 surrounding the outer surface of the inner electrode to prevent a short circuit between electrodes; and an outer electrode comprising an outer electrode active material layer 150 surrounding the outer surface of the separation layer 140 and an outer current collector 160 surrounding the outer surface of the outer electrode active material layer 150.

Besides such structure, the outer electrode may be configured with various structures depending on the disposition of the outer current collector and the outer electrode active material. For example, the outer electrode may be configured with a structure having the outer current collector formed to surround the outer surface of the separation layer, and the outer electrode active material layer formed to surround the outer surface of the outer current collector; a structure having the outer current collector formed to surround the outer surface of the separation layer, and the outer electrode active material layer formed to surround the outer surface of the outer current collector and come into contact with the separation layer; or a structure having the outer electrode active material layer formed to surround the outer surface of the separation layer, and the outer current collector formed to be included inside the outer electrode active material layer by being covered therein and to surround the outer surface of the separation layer with spacing apart therefrom.

Meanwhile, a cable-type secondary battery according to another aspect of the present invention, which has a horizontal cross section and extends longitudinally, comprises a core for supplying lithium ions, which comprises an electrolyte; an inner electrode comprising an open-structured inner current collector surrounding the outer surface of the core for supplying lithium ions, and an inner electrode active material layer surrounding the outer surface of the inner current collector; a separation layer surrounding the outer surface of the inner electrode to prevent a short circuit between electrodes; and an outer electrode surrounding the outer surface of the separation layer and comprising an outer current collector, an outer electrode active material layer, a conductive material-coating layer comprising a conductive material and a first polymer binder, and a porous coating layer comprising a second polymer binder.

As mentioned above, the porous coating layer may further comprise inorganic particles.

In such cable-type secondary battery, the outer electrode may be an anode, and the outer electrode active material layer may comprise an active material as mentioned above.

Figure 4:
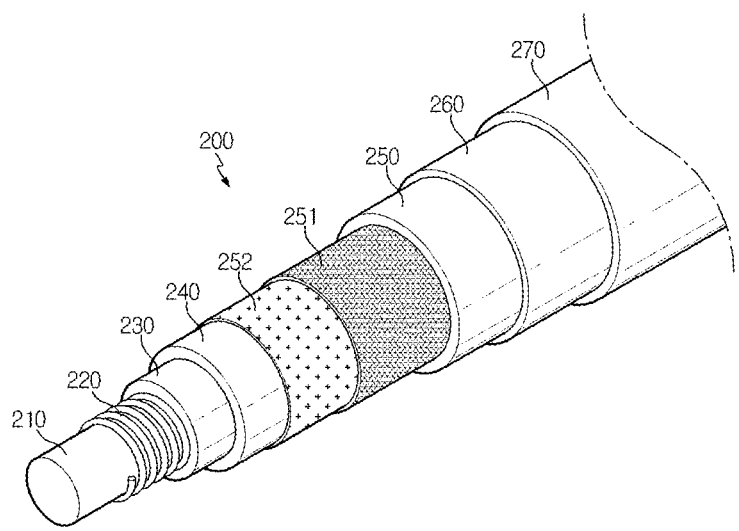
FIG. 4 is a perspective view showing a cable-type secondary battery having one inner electrode in accordance with another embodiment of the present invention.

FIG. 4 is a perspective view showing a cable-type secondary battery according to one embodiment of the present invention, in which a conductive material-coating layer and a porous coating layer are formed on an outer electrode.

Referring to FIG. 4, a cable-type secondary battery 200 comprises a core 210 for supplying lithium ions, which comprises an electrolyte; an inner electrode comprising an open-structured inner current collector 220 surrounding the outer surface of the core 210 for supplying lithium ions, and an inner electrode active material layer 230 surrounding the outer surface of the inner current collector 220; a separation layer 240 surrounding the outer surface of the inner electrode to prevent a short circuit between electrodes; and an outer electrode, comprising a porous coating layer 252 surrounding the outer surface of the separation layer 240 and comprising a second polymer binder, a conductive material-coating layer 251 surrounding the porous coating layer 252 and comprising a conductive material and a first polymer binder, an outer electrode active material layer 250 surrounding the conductive material-coating layer 251, and an outer current collector 260 surrounding the outer surface of the outer electrode active material layer 250.

Besides such structure, the outer electrode may be configured with various structures depending on the disposition of the conductive material-coating layer and the porous coating layer. For example, the outer electrode may be configured with a structure having the outer current collector formed to surround the outer surface of the separation layer, the outer electrode active material layer formed to surround the outer surface of the outer current collector, the conductive material-coating layer formed to surround the outer electrode active material layer and comprising a conductive material and a first polymer binder, and the porous coating layer formed to surround the conductive material-coating layer and comprising a second polymer binder; a structure having the outer current collector formed to surround the outer surface of the separation layer, the outer electrode active material layer formed to surround the outer surface of the outer current collector and come into contact with the separation layer, the conductive material-coating layer formed to surround the outer electrode active material layer and comprising a conductive material and a first polymer binder, and the porous coating layer formed to surround the conductive material-coating layer and comprising a second polymer binder; or a structure having the outer electrode active material layer formed to surround the outer surface of the separation layer, the outer current collector formed to be included inside the outer electrode active material layer by being covered therein and to surround the outer surface of the separation layer with spacing apart therefrom, the conductive material-coating layer formed to surround the outer electrode active material layer and comprising a conductive material and a first polymer binder, and the porous coating layer formed to surround the conductive material-coating layer and comprising a second polymer binder.

Meanwhile, in the present invention, the separation layer may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present invention can serve as a separator, and thus an additional separator may be omitted.

In the present invention, the electrolyte layer may further comprise a lithium salt. The lithium salt can improve an ionic conductivity and response time. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer. Among these, in order for the lithium ions of the core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Also, the cable-type secondary battery of the present invention has a protection coating. The protection coating is an insulator and is formed to surround the outer current collector, thereby protecting the electrodes against moisture in the air and external impacts. The protection coating may be made of conventional polymer resins, for example, PVC, HDPE or epoxy resins.

Meanwhile, a cable-type secondary battery according to still another embodiment of the present invention comprises two or more inner electrodes.

In the battery having two or more inner electrodes, when the inner electrodes are used as an anode, the battery comprises two or more cores for supplying lithium ions, which comprise an electrolyte; two or more inner electrodes arranged in parallel to each other, each inner electrode comprising an open-structured inner current collector surrounding the outer surface of each core for supplying lithium ions, an inner electrode active material layer surrounding the outer surface of the inner current collector, a conductive material-coating layer formed on the outer surface of the inner electrode active material layer and comprising a conductive material and a first polymer binder, and a porous coating layer formed on the outer surface of the conductive material-coating layer and comprising a second polymer binder; a separation layer surrounding the outer surface of the inner electrodes to prevent a short circuit between electrodes; and an outer electrode surrounding the outer surface of the separation layer and comprising an outer current collector and an outer electrode active material layer. Also, the battery may be configured to comprise two or more cores for supplying lithium ions, which comprise an electrolyte; two or more inner electrodes arranged in parallel to each other, each inner electrode comprising an open-structured inner current collector surrounding the outer surface of each core for supplying lithium ions, an inner electrode active material layer surrounding the surface of the inner current collector, a conductive material-coating layer formed on the outer surface of the inner electrode active material layer and comprising a conductive material and a first polymer binder, a porous coating layer formed on the outer surface of the conductive material-coating layer and comprising a second polymer binder, and a separation layer surrounding the outer surface of the porous coating layer to prevent a short circuit between electrodes; and an outer electrode surrounding the outer surface of the inner electrodes and comprising an outer current collector and an outer electrode active material layer.

In the battery, the porous coating layer may further comprise inorganic particles as mentioned above.

Hereinafter, FIG. 5 will be specifically described.

Figure 5:
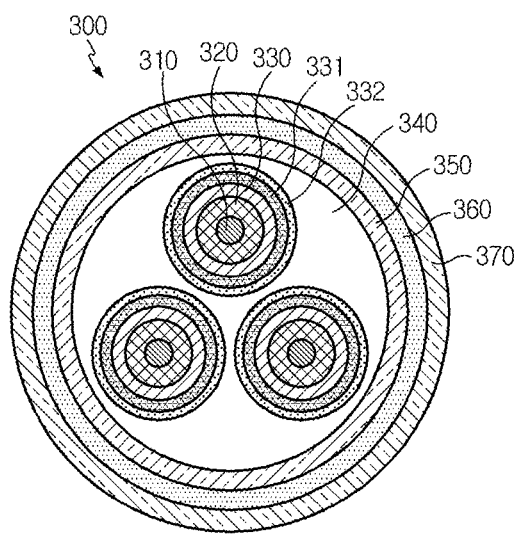
FIG. 5 is a cross-sectional view showing a cable-type secondary battery having two or more inner electrodes in accordance with one embodiment of the present invention.

Referring to FIG. 5, a cable-type secondary battery 300, which has multiple inner electrodes according to the present invention, comprises two or more cores 310 for supplying lithium ions, which comprise an electrolyte; two or more inner electrodes arranged in parallel to each other, each inner electrode comprising an open-structured inner current collector 320 surrounding the outer surface of each core 310 for supplying lithium ions, an inner electrode active material layer 330 surrounding the outer surface of the inner current collector 320, a conductive material-coating layer 331 formed on the outer surface of the inner electrode active material layer 330 and comprising a conductive material and a first polymer binder, and a porous coating layer 332 formed on the outer surface of the conductive material-coating layer 331 and comprising a second polymer binder; a separation layer 340 surrounding the outer surface of the inner electrodes to prevent a short circuit between electrodes; and an outer electrode comprising an outer electrode active material layer 350 surrounding the outer surface of the separation layer 340 and an outer current collector 360 surrounding the outer surface of the outer electrode active material layer 350.

Meanwhile, in the battery having two or more inner electrodes, when an outer electrode is used as an anode, the battery comprises two or more cores for supplying lithium ions, which comprise an electrolyte; two or more inner electrodes arranged in parallel to each other, each inner electrode comprising an open-structured inner current collector surrounding the outer surface of each core for supplying lithium ions, and an inner electrode active material layer surrounding the surface of the inner current collector; a separation layer surrounding the outer surface of the inner electrodes to prevent a short circuit between electrodes; and an outer electrode surrounding the outer surface of the separation layer and comprising an outer current collector, an outer electrode active material layer, a conductive material-coating layer comprising a conductive material and a first polymer binder, and a porous coating layer comprising a second polymer binder. Also, the battery may be configured to comprise two or more cores for supplying lithium ions, which comprise an electrolyte; two or more inner electrodes arranged in parallel to each other, each inner electrode comprising an open-structured inner current collector surrounding the outer surface of each core for supplying lithium ions, an inner electrode active material layer surrounding the surface of the inner current collector, and a separation layer surrounding the outer surface of the inner electrode active material layer to prevent a short circuit between electrodes; and an outer electrode surrounding the outer surface of the inner electrodes and comprising an outer current collector, an outer electrode active material layer, a conductive material-coating layer comprising a conductive material and a first polymer binder, and a porous coating layer comprising a second polymer binder.

In the battery, the porous coating layer may further comprise inorganic particles as mentioned above.

Hereinafter, FIG. 6 will be specifically described.

Figure 6:
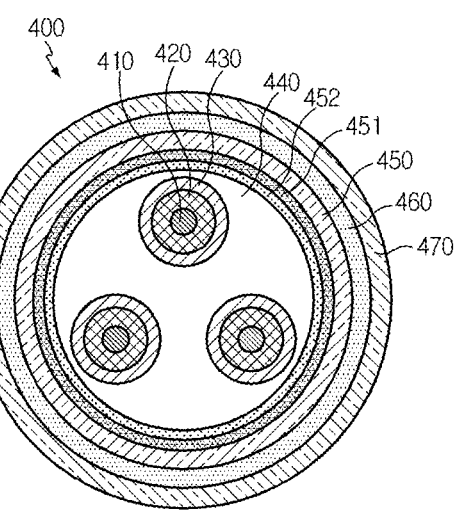
FIG. 6 is a cross-sectional view showing a cable-type secondary battery having two or more inner electrodes in accordance with another embodiment of the present invention.

Referring to FIG. 6, a cable-type secondary battery 400 comprises two or more cores 410 for supplying lithium ions, which comprise an electrolyte; two or more inner electrodes arranged in parallel to each other, each inner electrode comprising an open-structured inner current collector 420 surrounding the outer surface of each core 410 for supplying lithium ions, and an inner electrode active material layer 430 surrounding the surface of the inner current collector 420; a separation layer 440 surrounding the outer surface of the inner electrodes to prevent a short circuit between electrodes; and an outer electrode, comprising a porous coating layer 452 surrounding the outer surface of the separation layer 440 and comprising a second polymer binder, the conductive material-coating layer 451 surrounding the porous coating layer 452 and comprising a conductive material and a first polymer binder, the outer electrode active material layer 450 surrounding the conductive material-coating layer 451, and the outer current collector 460 surrounding the outer surface of the outer electrode active material layer 450.

Besides such structure, the outer electrode may be configured with various structures as mentioned above.

Such cable-type secondary batteries 300 and 400 have the inner electrode consisting of multiple electrodes, thereby allowing controlling the balance between a cathode and anode and preventing a short circuit.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example (1) Preparation of Electrode

A copper wire current collector (diameter 125 μm) was coated with an electrode active material comprising nickel and tin in a thickness of 2.5 μm by an electroplating process, to form an electrode active material layer.

Then, carbon fiber as a conductive material and polyvinylidene fluoride as a first polymer binder were mixed in a weight ratio of 60:40, and the mixture was added to N-methylpyrrolydone used as a solvent, to obtain a slurry. The slurry was coated on the whole outer surface of the electrode active material layer to form a conductive material-coating layer.

Figure 7:
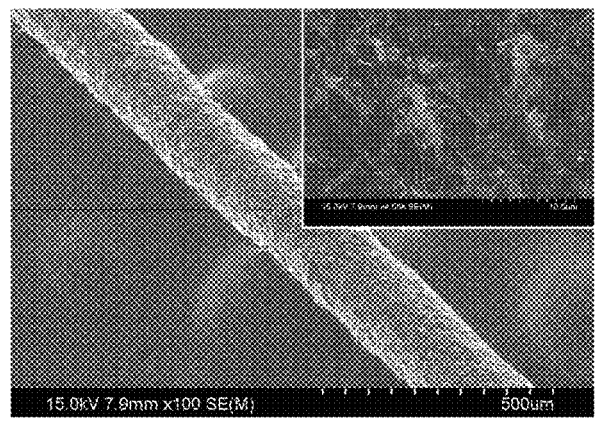
FIG. 7 is an SEM photograph of a wire electrode having a conductive material-coating layer, prepared in the Example of the present invention.

FIG. 7 is an SEM photograph of a wire electrode having a conductive material-coating layer.

Subsequently, silicon oxide ($SiO_2$) as inorganic particles and polyvinylidene fluoride-co-hexafluoro propylene (PVdF-HFP, 5%) as a second binder were mixed in a weight ratio of 10:90, and the mixture was added to an acetone solvent to obtain a solution containing the mixture in an amount of 6 wt %.

To the obtained solution, water is added as a non-solvent such that the amount of the mixture became 5 wt % based on the total weight of the solution.

The solution thus finally obtained was coated on the whole outer surface of the conductive material-coating layer, and the acetone solvent was evaporated at room temperature, followed by drying in a vacuum oven set to 100° C. for 10 hours, to form a porous coating layer.

Figure 8:
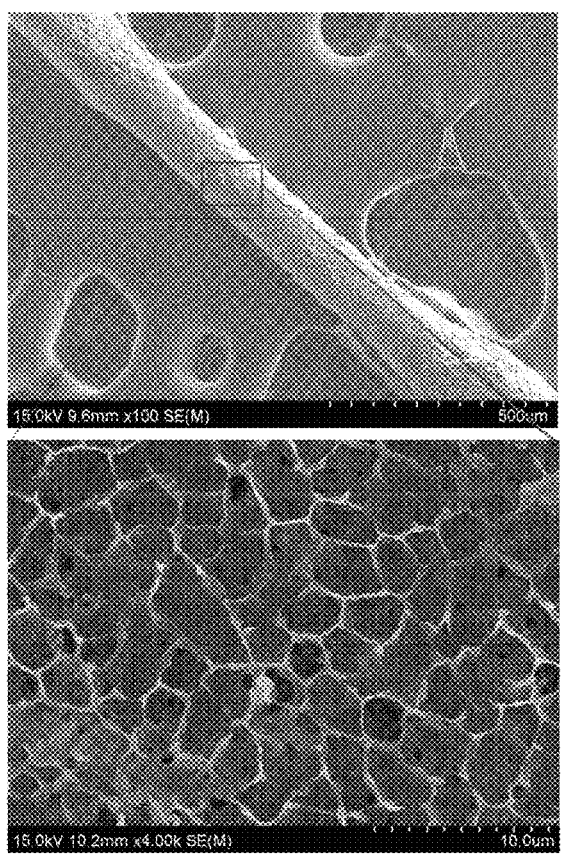
FIG. 8 is SEM photographs showing the shape of a porous coating layer obtained in the Example of the present invention.

FIG. 8 is SEM photographs showing the shape of a porous coating layer obtained by such procedures.

(2) Preparation of Coin-Type Half-Cell

The wire electrode prepared in step (1) was wound on a horizontal plane to produce a plate form, and was used as an anode. As a cathode, a metallic lithium foil was used. A polyethylene separator was interposed between the cathode and the anode to obtain an electrode assembly.

The electrode assembly was put in a battery case, to which 1M $LiPF_6$ of non-aqueous electrolyte solution was introduced, the electrolyte solution being obtained by mixing ethylene carbonate (EC) and diethyl carbonate (DEC) in a volume ratio of 1:2 and adding $LiPF_6$ to the resulting non-aqueous solvent until the concentration of $LiPF_6$ became 1M. Thereby, a coin-type half-cell was prepared.

Comparative Example (1) Preparation of Electrode

A copper wire current collector (diameter 125 μm) was coated with an electrode active material comprising nickel and tin in a thickness of 2.5 μm by an electroplating process, to form an electrode active material layer.

(2) Preparation of Coin-Type Half-Cell

The wire electrode prepared in step (1) was wound on a horizontal plane to produce a plate form, and was used as an anode. Other procedures were carried out in the same manners as in step (2) of Example 1, to prepare a coin-type half-cell.

Evaluation of Charge/Discharge Characteristics

The half-cells prepared in the Example and the Comparative Example were each evaluated for their charge/discharge characteristics.

The batteries were charged with a current density of 0.1 C up to 5 mV at constant current and then continuously charged with 5 mV at constant voltage, and the charging process was completed when the current density reached 0.005 C. Then, batteries were discharged with a current density of 0.5 C up to 1.5 V at constant current. The charging/discharging was repeated 30 times under the same conditions.

Figure 9:
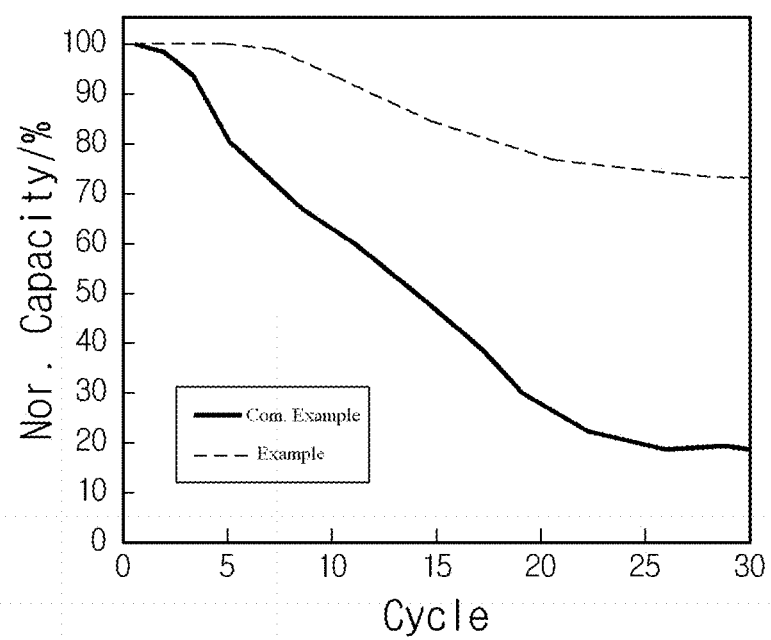
FIG. 9 is a graph showing the results of charging and discharging characteristics evaluated for batteries prepared in the Example and the Comparative Example of the present invention.

FIG. 9 is a graph showing cycle life characteristics of the batteries prepared in the Example and the Comparative Example during 30 cycles of charging/discharging processes.

As shown in FIG. 9, the battery of the Comparative Example exhibited a capacity decrease by about 20% after 30 cycles, whereas the battery of the Example maintained 70% or more of capacity. From this, it was confirmed that the battery of the Example had superior cycle life characteristics than the battery of the Comparative Example.

Meanwhile, the batteries were measured for their initial efficiency after the first cycle. The results thereof are shown in Table 1, from which the battery of the Example was confirmed to have good initial efficiency.

TABLE 1

| | Charge Capacity (mAh/g) | Discharge Capacity (mAh/g) | Efficiency of First Cycle (%) |
|---|---|---|---|
| Example | 888 | 790 | 88.9 |
| Com. Example | 868 | 640 | 73.7 |

Meanwhile, the embodiments proposed in the disclosure and the drawings are just specific examples for the better understanding of the present invention, and are not intended to limit the scope of the invention. Therefore, it is obvious to an ordinary person skilled in the art that other equivalents and modifications could be made thereto without departing from the spirit and scope of the disclosure.

What is claimed is:

1. A cable-type secondary battery having a horizontal cross section and extending longitudinally, comprising
a core for supplying lithium ions, the core including an electrolyte;
an inner electrode comprising an open-structured inner current collector surrounding an outer surface of the core and an inner electrode active material layer surrounding an outer surface of the inner current collector;
a separation layer surrounding an outer surface of the inner electrode to prevent a short circuit between electrodes; and
an outer electrode surrounding an outer surface of the separation layer, comprising an outer current collector, an outer electrode active material layer, a conductive material-coating layer comprising a conductive material and a first polymer binder, and a porous coating layer comprising a second polymer binder and inorganic particles, wherein the conductive material-coating layer does not include an active material,
wherein in the porous coating layer, the inorganic particles are bound to each other by the second polymer binder such that the inorganic particles are in contact with each other and interstitial volumes are formed between the inorganic particles, the interstitial volumes forming pores of the porous coating layer, and
wherein the inorganic particles are:
inorganic particles having a dielectric constant of 5 or higher selected from the group consisting of $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $SiO_2$, AlOOH, $Al(OH)_3$, $TiO_2$ and a mixture thereof,
inorganic particles having the ability to transport lithium ions selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof, or
a mixture thereof.

2. The cable-type secondary battery according to claim 1, wherein the conductive material and the first polymer binder in the conductive material-coating layer are present in a weight ratio of 1:10 to 8:10.

3. The cable-type secondary battery according to claim 1, wherein the conductive material-coating layer has pores having a size of 0.01 μm to 5 μm, and a porosity of 5% to 70%.

4. The cable-type secondary battery according to claim 1, wherein the conductive material comprises any one selected from the group consisting of carbon black, acetylene black, ketjen black, carbon fiber, carbon nanotube, graphene and a mixture thereof.

5. The cable-type secondary battery according to claim 1, wherein the first polymer binder is selected from the group consisting of polyvinylidene fluoride (PVDF), hexafluoro propylene (HFP), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

6. The cable-type secondary battery according to claim 1, wherein the porous coating layer has pores having a size of 0.01 μm to 10 μm, and a porosity of 5% to 95%.

7. The cable-type secondary battery according to claim 1, wherein the inorganic particles and the second polymer binder in the porous coating layer are present in a weight ratio of 10:90 to 95:5.

8. The cable-type secondary battery according to claim 1, wherein the inorganic particles have an average diameter of 10 nm to 5 μm.

9. The cable-type secondary battery according to claim 1, wherein the second polymer binder is selected from the group consisting of polyvinylidene fluoride (PVDF), hexafluoro propylene (HFP), polyvinylidene fluoride-cohexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

10. The cable-type secondary battery according to claim 1, wherein the open-structured inner current collector is a wound wire form, a wound sheet form or a mesh form.

11. The cable-type secondary battery according to claim 1, wherein the outer electrode is an anode, and the outer electrode active material layer comprises an active material selected from the group consisting of metals (Me) including Si, Sn, Li, Al, Ag, Bi, In, Ge, Pb, Pt, Ti, Zn, Mg, Cd, Ce, Cu, Co, Ni and Fe; alloys of the metals; oxides ($MeO_x$) of the metals; and a mixture thereof.

12. The cable-type secondary battery according to claim 1, wherein in the outer electrode,
the porous coating layer is formed to surround the outer surface of the separation layer, the conductive material-coating layer is formed to surround the porous coating layer, the outer electrode active material layer is formed to surround the conductive material-coating layer, and the outer current collector is formed to surround an outer surface of the outer electrode active material layer.

13. The cable-type secondary battery according to claim 1, wherein the separation layer is an electrolyte layer or a separator.

14. The cable-type secondary battery according to claim 13, wherein the electrolyte layer comprises an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

15. The cable-type secondary battery according to claim 14, wherein the electrolyte layer further comprises a lithium salt.

16. The cable-type secondary battery according to claim 15, wherein the lithium salt is selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

17. The cable-type secondary battery according to claim 13, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer.

18. The cable-type secondary battery according to claim 1, wherein in the outer electrode, the outer current collector is formed to surround the outer surface of the separation layer, the outer electrode active material layer is formed to surround an outer surface of the outer current collector, the conductive material-coating layer is formed to surround the outer electrode active material layer, and the porous coating layer is formed to surround the conductive material-coating layer.

19. The cable-type secondary battery according to claim 1, wherein in the outer electrode, the outer current collector is formed to surround the outer surface of the separation layer, the outer electrode active material layer is formed to surround an outer surface of the outer current collector and come into contact with the separation layer, the conductive material-coating layer is formed to surround the outer electrode active material layer, and the porous coating layer is formed to surround the conductive material-coating layer.

20. The cable-type secondary battery according to claim 1, wherein in the outer electrode, the outer electrode active material layer is formed to surround the outer surface of the separation layer, the outer current collector is formed to be included inside the outer electrode active material layer by being covered therein and to surround the outer surface of the separation layer with spacing apart therefrom, the conductive material-coating layer is formed to surround the outer electrode active material layer, and the porous coating layer is formed to surround the conductive material-coating layer.

* * * * *